United States Patent [19]

Fiala et al.

[11] 4,449,748
[45] May 22, 1984

[54] UTILITY VEHICLE BODY

[75] Inventors: Ernst Fiala; Fritz Schael; Reiner Schoedder, all of Wolfsburg, Fed. Rep. of Germany

[73] Assignee: Volkswagenwerk Aktiengesellschaft, Fed. Rep. of Germany

[21] Appl. No.: 243,475

[22] Filed: Mar. 13, 1981

Related U.S. Application Data

[63] Continuation of Ser. No. 918,473, Jun. 23, 1978, abandoned.

[30] Foreign Application Priority Data

Jul. 6, 1977 [DE] Fed. Rep. of Germany ....... 2730425

[51] Int. Cl.³ .............................................. B62D 23/00
[52] U.S. Cl. ..................................... 296/183; 296/185
[58] Field of Search ............... 296/29, 30, 180, 183, 296/184, 185, 187, 188, 190–197, 203–205

[56] References Cited

U.S. PATENT DOCUMENTS

| 2,157,075 | 5/1939 | Grade | 296/185 |
| 2,425,948 | 8/1947 | Lucien | 296/196 |
| 3,753,573 | 8/1973 | Ariga et al. | 296/203 |
| 3,989,562 | 11/1976 | Hladik et al. | 296/187 |
| 4,043,583 | 8/1977 | Tidwell, Jr. | 296/204 |
| 4,135,756 | 1/1979 | Hausmann | 296/190 |

FOREIGN PATENT DOCUMENTS

| 1372801 | 8/1964 | France | 296/183 |
| 941747 | 11/1963 | United Kingdom | 296/191 |

OTHER PUBLICATIONS

Prospektblatt der Firma Peugeot Automobile Deutschland GmbH, 8/1967.
Magazine: Automobile Engineer, 12/1969, pp. 492 and 493.
Magazine: Kraftfahrzeug Technik, 5/1970, p. 150, Illust. 3.

*Primary Examiner*—Joseph F. Peters, Jr.
*Assistant Examiner*—Ross Weaver
*Attorney, Agent, or Firm*—Brumbaugh, Graves, Donohue & Raymond

[57] ABSTRACT

A utility vehicle body is fabricated with a closed cab portion and an open cargo portion. The cab portion is arranged to be resistant to bending moments in the longitudinal direction of the vehicle and resistant to torsion forces. For this purpose, there is provided a torsion resistant frame extending around the entire circumference of the rear wall of the cab portion. The cargo portion has an approximately U-shaped transverse cross-section and is therefore resistant to bending in the longitudinal direction, but by itself is not resistant to torsion forces. The cargo portion is rendered resistant to torsion forces by reason of its attachment on the rear wall of the cab portion.

11 Claims, 3 Drawing Figures

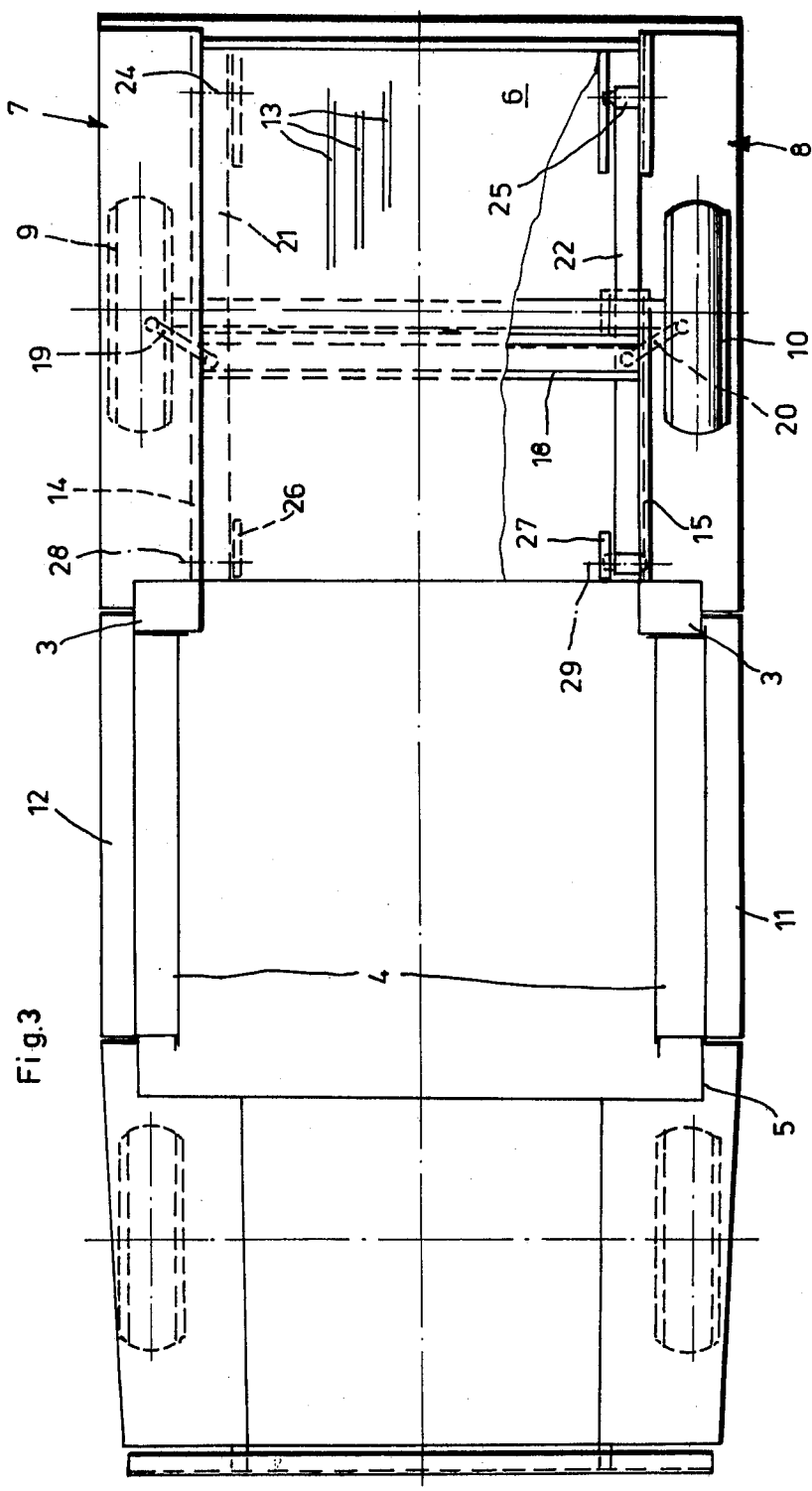

UTILITY VEHICLE BODY

This is a continuation, division, of application Ser. No. 918,473 filed June 23, 1978, now abandoned.

BACKGROUND OF THE INVENTION

This invention relates to self-supporting vehicle bodies, and particularly to bodies for utility vehicles, such as pick-up trucks. Vehicles of this type are usually provided with a closed cab to accommodate the operator and passengers. The cargo portion of the vehicle is usually an open platform-like structure with sidewalls. Such vehicles are often provided with added structures for covering the cargo portion, but these covering structures do not contribute to vehicle rigidity and strength.

It is an object of the present invention to provide a body for a utility vehicle which is self-supporting, and has a minimum of structural beams. A vehicle body of this type must be resistant to both bending forces and torsion forces, which are imposed upon the vehicle during operation. The elimination of most structural beams makes it possible to reduce the weight and manufacturing cost of the utility vehicle, and also provide a more versatile vehicle since modification of the vehicle will not be inhibited by the presence of structural beams. The basic utility vehicle body of the present invention can therefore be modified by adding a variety of structures to provide a vehicle suitable for many different uses.

SUMMARY OF THE INVENTION

In accordance with the invention, there is provided a body for a utility vehicle which includes a closed cab portion and an open cargo portion. The cab portion has a bending and torsion resistant construction, including a torsion resistant frame forming a structural component extending around the entire circumference of the rear wall of the cab portion. The cargo portion has an approximately U-shaped transverse cross-section and is bending resistant and torsion yielding in the longitudinal direction of the vehicle. The cargo portion is rendered torsion resistant by attachment to the torsion resistant frame.

The frame may be fabricated out of structural members having a closed cross-sectional configuration. The cargo portion usually includes a loading platform and sidewall members extending over the length of the cargo portion on each side of the platform and forming sidewalls and fenders. The sidewall members are connected with both the platform and the frame. The sidewall members may extend along the side of the cab portion as far as the door opening of the cab portion. The loading platform and sidewall members may be fabricated out of a continuous metal plate. There may be provided braces reinforcing the strength of the sidewall members and gussets interconnecting the sidewall members and the frame of the cab portion. Each of the gussets may consist of a piece of flat material, the edges of which are stiffened by an angled extension. The gussets can be in the form of a right triangle having unequal sides and attached to the frame by the shortest side. The loading platform may be further stiffened by providing longitudinal corregations.

The cargo portion may be provided with a cross beam in the vicinity of the rear axle. The rear axle may be mounted on leaf springs which are mounted to the sidewall members and to support members connected to the frame.

In accordance with the invention, there is provided a relatively inexpensive construction in which the torsion resistance of the cargo portion of the vehicle can be provided by mounting the cargo portion to a torsion resistant cab portion. Thus, the rather extensive structural configuration which would ordinarily be required to render the cargo portion torsion resistant is not required.

In one embodiment, a single plate of metal is used to form the loading platform and sidewall members, which also serve as fenders for the rear wheels of the vehicle. In this respect, the construction is similar to prior German Applications Nos. 1,480,434; 1,630,211 and German Pat. No. 972,739.

By providing leaf springs to support the rear axle, and mounting the springs to the cab portion frame and the rear of the sidewall members, the loading platform itself can be kept relatively free from chassis forces and therefore free of flexing during vehicle operation.

For a better understanding of the present invention, together with other and further objects, reference is made to the following description taken in conjunction with the accompanying drawings, and its scope will be pointed out in the appended claims.

BRIEF DESCRIPTION OF THE DRAWINGS

FIG. 3 is an elevation cross-section of the FIG. 1 vehicle.

DESCRIPTION OF THE INVENTION

Figure 1:
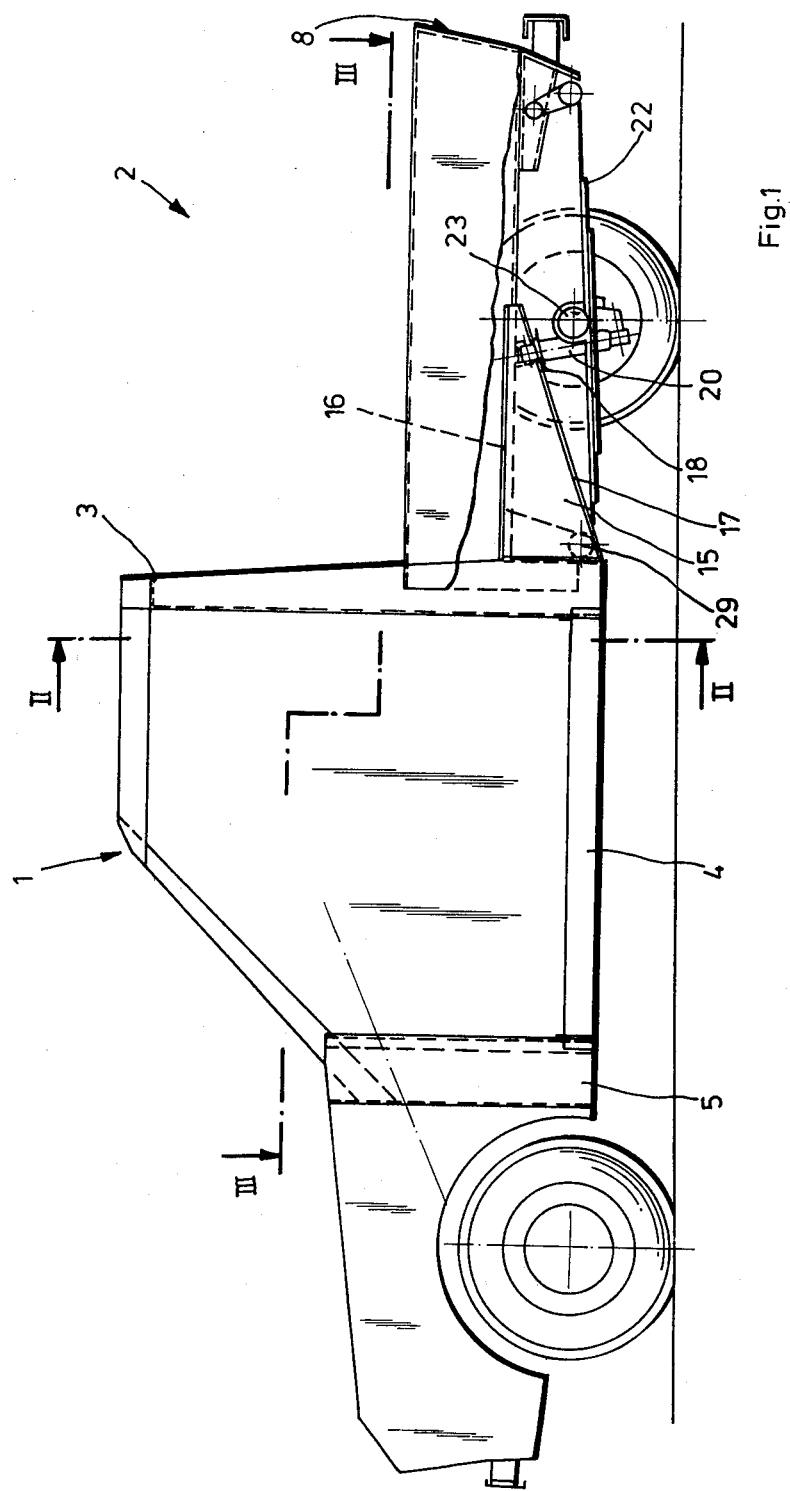
FIG. 1 is a side view of a vehicle having a body constructed in accordance with the present invention.
Figure 2:
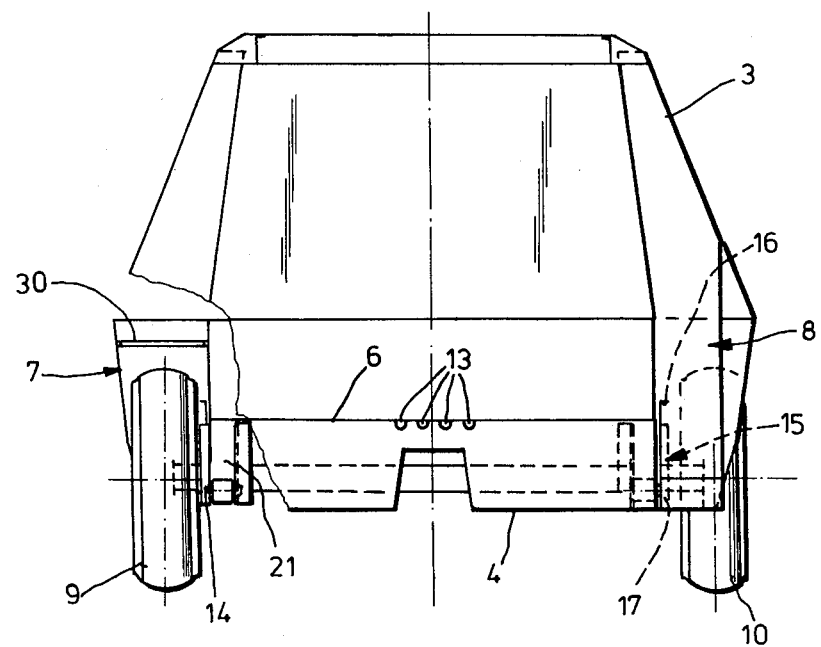
FIG. 2 is a transverse cross-section of the FIG. 1 vehicle.

The vehicle shown in FIGS. 1 through 3 includes a cab portion 1 and a cargo portion 2. In accordance with the principles of the present invention, the cab portion 1 is constructed to be relatively rigid for both longitudinal bending forces and longitudinal torsion forces which the vehicle may encounter during operation. The cargo portion 2 is also relatively bending resistant, by reason of the general U-shaped cross-section of the cargo portion, but is not of itself resistant to longitudinal torsion forces. The lack of torsion resistance for the cargo portion does not result from the deliberate attempt to make that portion flexible, but is the result of the fact that the cargo portion is relatively free of structural beams which would tend to inhibit torsion flexing.

The cab portion 1 of the vehicle includes a torsion resistant frame 3, which is fabricated of closed cross-section structural beams. Frame 3 extends around the entire circumference of the rear wall of cab portion 1. Frame 3 is rigidly connected to vehicle floor 4 and wall 5 at the front of cab 1. By the rigid connection of frame 3, floor 4 wall 5, and the roof ties, the assembled cab portion 1 is substantially rigid and therefore bending and torsion resistant.

Cargo portion 2 includes loading platform 6 and sidewall members 7 and 8 which extend over the entire length of the cargo portion. Examination of FIG. 2 indicates that the sidewall members are open towards the bottom and perform several functions. The sidewall members act as sides of the cargo portion of the vehicle, form fenders for the rear wheels of the vehicle, and consist of longitudinal bending resistant support members for the vehicle cargo portion 2. Plates, not shown in the drawings, can be provided to close the sidewall structure at the rear end of the vehicle. These plates may be used for mounting vehicle signal lights and other equipment.

At their forward end, sidewall members 7 and 8 partially overlap frame 3, and may extend as far forward as the vehicle door openings 11 and 12. Flanges provided at the front portion of sidewalls 7 and 8 are rigidly welded to frame 3 so that following assembly of the cab portion 1 to the cargo portion 2, frame 3 renders the cargo portion of the vehicle resistant to torsion forces.

Loading platform 6 may be provided with longitudinal corrugations 13 to increase the bending resistance of the platform.

The cross-sectional view of FIG. 2 illustrates that a single metal plate may be shaped to form loading platform 6 and sidewall members 7 and 8. This eliminates the need for a welded connection between sidewall members 7 and 8 and platform 6. Gussets 14 and 15, which have generally the shape of right triangles may be provided for rigidity between sidewall members 7 and 8 and frame 3. These are arranged in the longitudinal direction of the vehicle and provide extra stiffening of the cargo portion. The edges 16 and 17 of the gussets may be bent at a right angle to provide additional rigidity and to act as a flange for attachment of the gussets to the frame and sidewall members. Further stiffening may be provided by braces 30 in sidewall members 7 and 8.

A cross beam 18 is provided under platform 6 in the vicinity of the rear axle and provides a mounting member for shock absorbers 19 and 20 which are provided for rear wheels 9 and 10 respectively. This cross beam relieves the cargo platform from the wheel forces. Axle bumpers may also be mounted on the cross-beam.

The rear axle is mounted by the use of leaf springs 21 and 22. The leaf springs are provided with yolks to support the axle 23. The springs are mounted at their rear extremities 24 and 25 to brackets on the sidewall members of the cargo portion, while the front extremities of the leaf springs are mounted to frame 3 by the use of supports 26 and 27 as well as gussets 14 and 15. Pins 28 and 29 which support the front ends of the springs pass through the springs, the gussets, and the support brackets. By the arrangement shown, the leaf springs span the entire length of the cargo portion, and by this arrangement the cargo portion is relieved of much of the vehicle load forces.

While there has been described what is believed to be the preferred embodiment of the invention, those skilled in the art will recognize that other and further modifications may be made thereto without departing from the spirit of the invention and it is intended to claim all such embodiments as fall within the true scope of the invention.

We claim:

1. A self supporting body for a utility vehicle comprising a closed cab portion, having front, rear, and side walls, mounted only on the front wheels of said vehicle and an open cargo portion mounted only on the rear wheels of said vehicle, said cab portion having a bending and torsion resistant construction, including a torsion resistant frame having a closed cross sectional configuration and forming a structural component extending around the entire circumference of said rear wall of said cab portion, and said cargo portion having an approximately U-shaped transverse cross-section, said cargo portion being of itself bending resistant in the longitudinal direction of the vehicle and torsion yielding, and said cargo portion being rendered torsion resistant by attachment to said torsion resistant frame.

2. A body as specified in claim 1 wherein said cargo portion comprises a loading platform and rigid sidewall support members, said support members extending over the entire length of said cargo portion on each side of said platform and forming side walls and wheel housings, said sidewall support members being connected with both said platform and said frame.

3. A body as specified in claim 2 wherein said cab portion is provided with door openings on each side of said vehicle and wherein said sidewall support members extend to said door openings.

4. A body as specified in claim 2 wherein said loading platform and sidewall support members are fabricated out of a continuous metal plate.

5. A body as specified in claim 4 wherein said sidewall support members are provided with reinforcing braces.

6. A body as specified in claim 2 wherein there are provided gussets interconnecting said frame and said sidewall members adjacent said loading platform.

7. A body as specified in claim 6 wherein each of said gussets comprise a piece of flat material having an edge stiffened by an angled extension.

8. A body as specified in claim 6 wherein each of said gussets has the form of a right triangle having unequal sides, and wherein each of said gussets is attached to said frame by its shortest side.

9. A body as specified in claim 1 wherein there is provided a cross beam extending in a transverse direction under said cargo portion, said beam being arranged to stiffen said cargo portion and connect to a rear axle.

10. A body as specified in claim 2 wherein there are provided leaf springs mounted to said body for supporting a rear axle, said springs being mounted at their rear end to said sidewall members and at their front end to support members rigidly connected to said frame.

11. A body as specified in claim 2 wherein said platform has longitudinal corrugations.

* * * * *